United States Patent
Kurina et al.

(10) Patent No.: US 8,213,291 B2
(45) Date of Patent: Jul. 3, 2012

(54) WIRELESS DATA TRANSMISSION METHODS, DEVICES, AND SYSTEMS

(75) Inventors: Anna Kurina, Nizhny Novgorod (RU); Alexey Kalinin, Nizhny Novgorod (RU); Dmitry Gusev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1191 days.

(21) Appl. No.: 11/917,275

(22) PCT Filed: Jun. 29, 2005

(86) PCT No.: PCT/RU2005/000358
§ 371 (c)(1),
(2), (4) Date: Dec. 12, 2007

(87) PCT Pub. No.: WO2007/001204
PCT Pub. Date: Jan. 4, 2007

(65) Prior Publication Data
US 2008/0207120 A1    Aug. 28, 2008

(51) Int. Cl.
*H04L 12/28*    (2006.01)
*H04L 12/56*    (2006.01)
(52) U.S. Cl. .................. 370/204; 370/389; 375/240.25

(58) Field of Classification Search .................. None
See application file for complete search history.

(56) References Cited

U.S. PATENT DOCUMENTS

| | | | |
|---|---|---|---|
| 6,671,287 B1 | 12/2003 | Huttunen et al. | |
| 2004/0133702 A1* | 7/2004 | McCann et al. | 709/247 |
| 2005/0138530 A1* | 6/2005 | Huang et al. | 714/774 |
| 2008/0002565 A1* | 1/2008 | Spencer | 370/204 |

FOREIGN PATENT DOCUMENTS

| | | |
|---|---|---|
| WO | WO-2004098118 A1 | 11/2004 |
| WO | WO-2007001204 A1 | 1/2007 |

* cited by examiner

*Primary Examiner* — Chirag Shah
*Assistant Examiner* — Minh-Trang Nguyen
(74) *Attorney, Agent, or Firm* — Schwegman, Lundberg & Woessner, P.A.

(57) ABSTRACT

Method and system for creating a radio block header that identifies a selected data block, a first compression scheme to compress a first encoded instance of the selected data block, and a second compression scheme to compress a second encoded instance of the selected data block, wherein the second compression scheme is different from the first compression scheme and for forming a radio block that includes the radio block header, a first instance of the selected data block, and a second instance of the selected data block.

25 Claims, 7 Drawing Sheets

WIRELESS DATA TRANSMISSION METHODS, DEVICES, AND SYSTEMS

RELATED APPLICATIONS

This application is a U.S. National Stage Filing under 35 U.S.C. 371 from International Patent Application No. PCT/RU2005/000358, filed on Jun. 29, 2005, and published in English as WO 2007/001204 on Jan. 4, 2007, which is incorporated herein by reference.

TECHNICAL FIELD

The inventive subject matter pertains to wireless networks and, more particularly, to transmission of data between a transmitter and a receiver in a wireless network.

BACKGROUND

A wireless device may be capable of communicating over a network using one or more defined data transfer specifications. For example, a wireless device may support an Institute of Electrical and Electronics Engineers (IEEE) 802.11 standard, a European Telecommunications Standards Institute (ETSI) specification, and/or another wireless-based standard or specification. For example, a particular ETSI specification is Enhanced General Packet Radio Service (EGPRS), also known as Enhanced Data rates for Global Evolution (EDGE). EGPRS is a specification for data transfer on Global System for Mobile communications (GSM) and Time Division Multiple Access (TDMA) networks.

In an acknowledged mode of operation, a minimal communication protocol between a transmitter and a receiver may include: 1) an encoded data block sent from the transmitter to the receiver; and 2) an acknowledgment (ACK) or no acknowledgement (NACK) message sent from the receiver to the transmitter, which indicates whether the encoded block was received and decoded correctly. Some data transfer specification versions anticipate an ACK or NACK after each sent data block. Other versions may support transmission of data blocks with selective acknowledgement. The communication protocol between the transmitter and the receiver may include other control messages, as well (e.g., Release, Link Control, etc.). For purposes of brevity, these additional messages are not described in detail herein.

Either way, if the transmitter does not receive an ACK within a particular time interval, the transmitter may assume that the receiver did not receive or decode one or more data blocks correctly. In this case, or when the transmitter receives a NACK message, the transmitter may retransmit the data block. In the presence of a noisy channel, retransmissions may be frequent, which may effectively reduce the data transfer rate.

BRIEF DESCRIPTION OF THE DRAWINGS

The appended claims point out different embodiments of the inventive subject matter with particularity. However, the detailed description presents a more complete understanding of the inventive subject matter when considered in connection with the figures, wherein like-reference numbers refer to similar items throughout the figures and:

DETAILED DESCRIPTION

Embodiments of the inventive subject matter may be implemented, for example but not by way of limitation, in a communications network, such as a wide area network (WAN), a local area network (WAN), or a personal area network (PAN). Such a network may be wired or wireless. For example, but not by way of limitation, embodiments may be implemented in a wireless WAN (WWAN), a wireless LAN (WLAN), a wireless PAN (WPAN) and/or a wireless device that communicates on one or more of these networks. Various embodiments of a wireless network and a wireless device are described in conjunction with FIGS. 1 and 2. It is to be understood that embodiments of the inventive subject matter may be implemented in wired networks, combined wired and wireless networks, and/or otherwise configured wireless networks.

Figure 1:
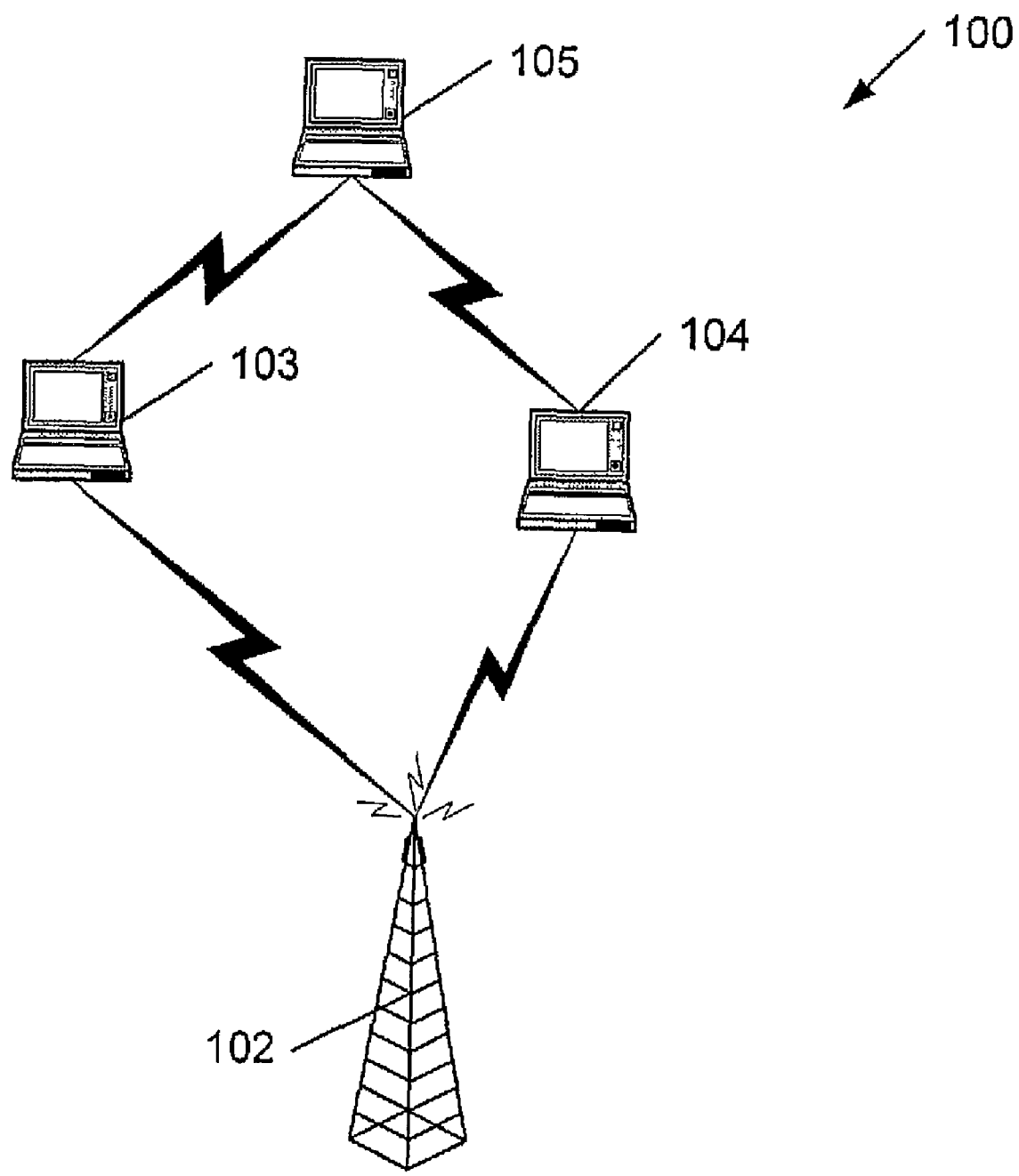
FIG. 1 is a simplified diagram of an example network, in accordance with an embodiment of the inventive subject matter.

FIG. 1 is a simplified diagram of an example wireless network 100, in accordance with an embodiment of the inventive subject matter. A wireless network may include zero or more base stations 102 and multiple network stations 103, 104, 105.

In a wireless network, network stations 103-105 communicate over the medium of free space, often referred to as the "air interface" or the "physical channel." Generally, a network station 103-105 may be referred to as a network adapter or network interface card (NIC). A network station 103-105 may be mobile, portable or stationary. For example, a network station 103-105 may be a wireless-enabled laptop or desktop computer, a phone, a personal data assistant, a handheld radio, or virtually any other one-way or two-way device with the capability of communicating with other devices 103-105 or base stations 102 over a wireless medium.

A set of network stations 103-105 may communicate directly with each other, as is the case in a Basic Service Set (BSS). An Independent BSS (IBSS) is a BSS in which there is no connection to a wired network. An infrastructure BSS is a BSS in which a BSS includes a base station (e.g., base station 102). In an infrastructure BSS, network stations (e.g., stations 103, 104) may communicate with a base station 102. The base station 102 may provide a connection to a wired network (e.g., a LAN), if any, and also may provide a local relay function for the BSS. Accordingly, in an infrastructure BSS, if a first network station 103 wants to communicate with a second network station 104, the first network station 103 may send the communication to the base station 102, and the base station 102 may relay the communication to the second station 104.

During the process of setting up communications between two network stations (e.g., network stations 104 and 105) or between a network station and a base station (e.g., network station 103 and base station 102), a modulation and coding scheme may be determined. The modulation and coding scheme selected may be based, at least in part, on the channel quality, and as channel conditions change, a different scheme may be selected. When the channel is very noisy, a more robust scheme may be selected, which may provide for a relatively low effective data transfer rate. When the channel is very quiet, a less robust scheme may be selected, which may provide for a relatively high effective data transfer rate. For example, EGPRS supports nine Modulation and Coding Schemes (MCS), designated MCS-1 through MCS-9. As will be described in more detail later, embodiments of the inventive subject matter may be implemented in conjunction with MCS-7, MCS-8, and MCS-9 of EGPRS, which may be selected when channel conditions are relatively good.

Figure 2:
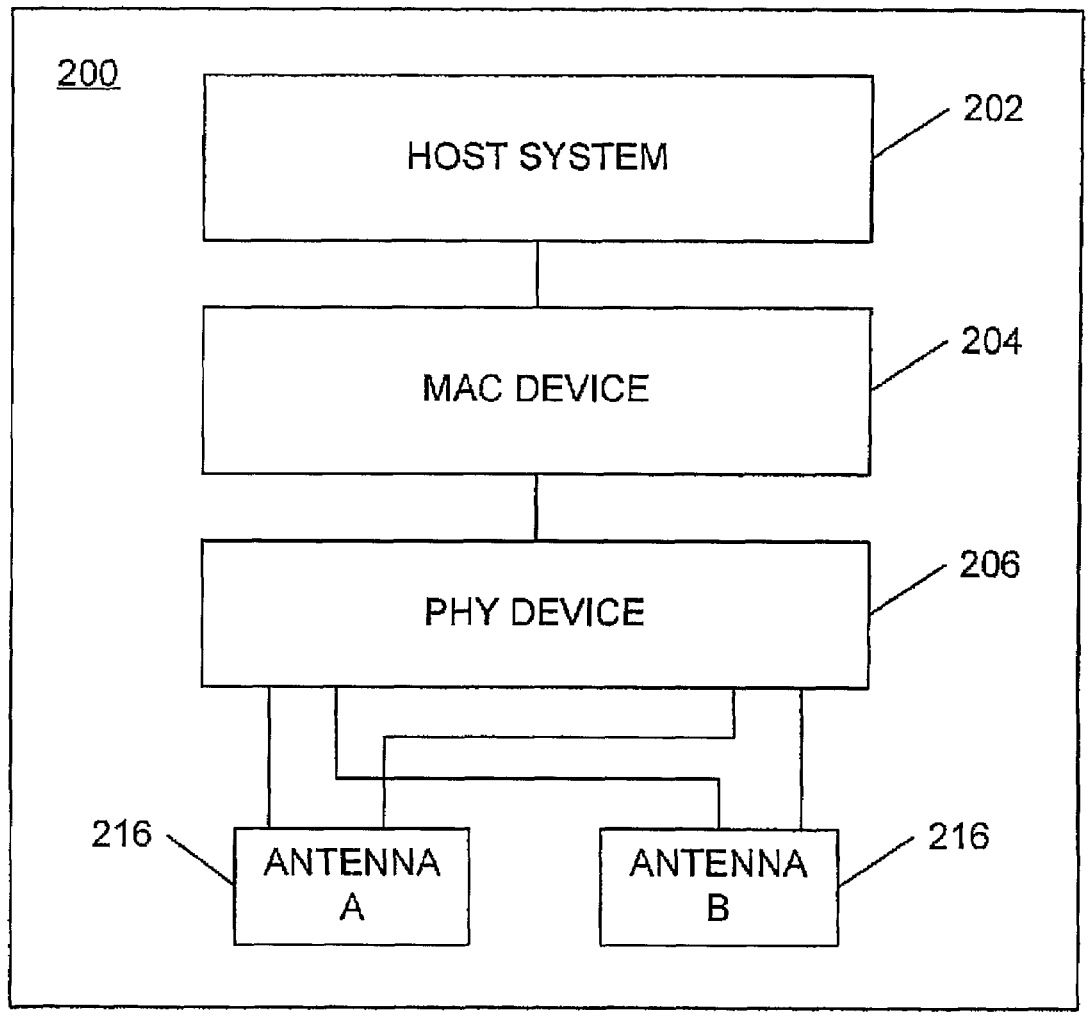
FIG. 2 is a simplified block diagram of a network station, in accordance with an embodiment.

FIG. 2 is a simplified block diagram of a wireless network station 200 (e.g., stations 103-105, FIG. 1) in accordance with an embodiment of the inventive subject matter. A wireless network station 200 may include a host system 202, a Medium Access Control device 204 ("MAC device"), and a physical layer signaling control device 206 ("PHY device").

Host system 202 may produce and process data and implement one or more higher layers of a communication protocol, among other things. In an embodiment, host system 202 implements a Logical Link Control (LLC) layer, among other higher layers. LLC layer may produce and process data frames, which may be referred to as LLC Protocol Data Units (PDUs). In a transmit mode, the LLC layer may provide a data frame to the MAC layer, which is implemented in MAC device 204.

When the MAC layer receives a data frame from the LLC layer, the MAC layer may divide the frame into one or more Radio Link Control data blocks ("RLC data blocks" or "data blocks"), in an embodiment. The MAC layer may produce a header, and form a radio block from the header and one or more of the data blocks. For example, MCS-1 through MCS-6 of EGPRS specify a radio block that includes a header and one data block. MCS-7 through MCS-9 specify a radio block that includes a header and two data blocks. MAC layer may provide the radio block to the PHY layer, which is implemented in PHY device 206. MAC device 204 may or may not encrypt a radio block, prior to providing it to the PHY layer.

The PHY layer may perform channel coding and modulation in accordance with the selected modulation and coding scheme (e.g., one of MCS-1 through MCS-9 of EGPRS). In an embodiment, channel coding may include convolutional encoding, which provides redundancy to the data according to a selectable encoding scheme.

The PHY layer also performs a compression scheme (e.g., a puncturing scheme), in an embodiment, which selectively omits bits from a convolutionally encoded data block. For each MCS, EGPRS specifies a set of selectable puncturing schemes, designated "Pi", where i may equal 1, 2 or 3. Each of the schemes selectively omits different bits.

When a receive apparatus receives an encoded data block that has been compressed (e.g., punctured), it performs a decompression process, which includes an inverse process to the compression process used at the transmit apparatus. This may include inserting "unknown" values in the bit locations that had been omitted by the transmit apparatus. The receive apparatus decoder may successfully resolve the unknown bits within the decompressed data block by estimating the probabilities that the bits have certain values.

In an acknowledged mode of operation, if the decoding process is successful, the receive apparatus may send a single or multiple-packet acknowledgement (ACK) message to the transmit apparatus. A multiple-packet ACK message may indicate the successful or unsuccessful decoding of multiple data blocks. If the decoding process is not successful, then the receive apparatus may not send the ACK message and/or may send a no acknowledgement (NACK) message. If the transmit apparatus does not receive an ACK message within a certain period of time or if the transmit apparatus receives a NACK message, then the transmit apparatus may re-encode and retransmit the radio block. Typically, the transmit apparatus may encode the radio block for retransmission using one or more different puncturing schemes than were used for the original transmission.

A system may implement a process referred to as "incremental redundancy." Implementation of incremental redundancy may enable higher data rates to be achieved by combining information, during decoding, from different transmissions of data blocks. More specifically, if a decoding process for a first data block fails, the receiver may store the first data block and wait for a retransmitted version of the first data block. If the originally transmitted data block and the retransmitted data block were punctured using different puncturing schemes, then the receiver may produce a combined, decompressed data block, which may have fewer unknown bit values than either the originally transmitted or retransmitted data blocks. This may be achieved by combining the originally transmitted, decompressed data block and the retransmitted, decompressed data block. Because fewer unknown bit values may exist in the combined data block, the likelihood may increase that the combined data block will be successfully decoded.

For any given radio block, various combinations of modulation and coding schemes and puncturing schemes may be selected. In an embodiment, the PHY layer receives information specifying how to encode and puncture a radio block by evaluating Coding and Puncturing Scheme (CPS) information within the radio block header. The CPS information may indicate, for example, that MCS-7 should be used to encode and modulate the data blocks within a radio block, that P1 should be used to puncture the first data block, and P3 should be used to puncture the second encoded data block.

The PHY layer also may produce a preamble and a PHY header, and convert these items, along with the encoded, modulated, and punctured radio block, into an analog signal for transmission over the physical channel. Accordingly, PHY device 202 may include or communicate with one or more antennas 216 (e.g., dipole antennas). When an infrared (IR) baseband specification is implemented, a light-emitting diode (LED) (not shown) or other optical transmission device may be used instead of or in addition to antennas 216.

Figure 3:
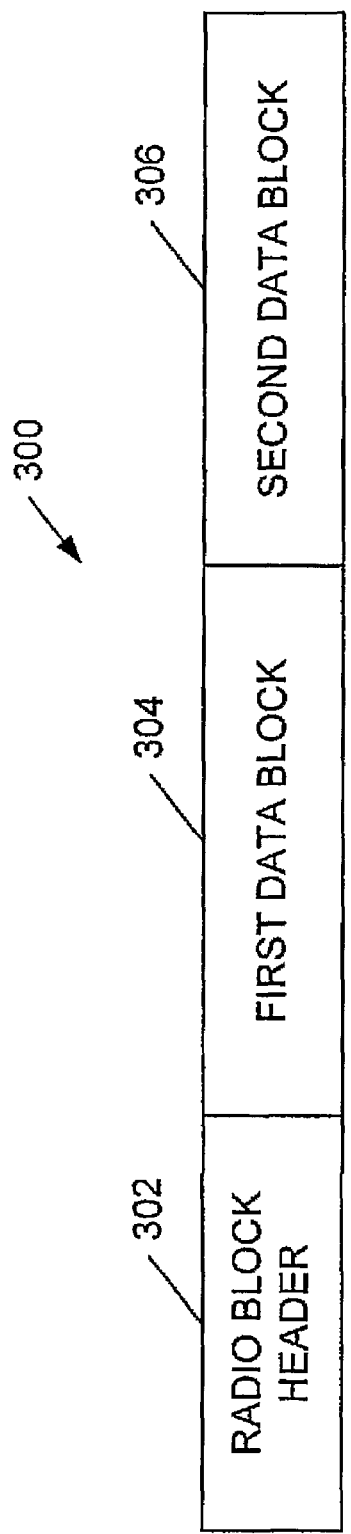
FIG. 3 illustrates an example of a radio block, in accordance with an embodiment.

FIG. 3 illustrates an example of a radio block 300, in accordance with an embodiment. A radio block may include a radio block header 302 and from one to multiple data blocks 304, 306. As mentioned previously, for MCS-7, MCS-8, and MCS-9 of EGPRS, a radio block may include two data blocks 304, 306. Although embodiments are described herein with respect to a radio block having two data blocks 304, 306, embodiments may be applied when a radio block includes more than two data blocks. Each data block 304, 306 may include user data or upper layers' signaling data.

Figure 4:
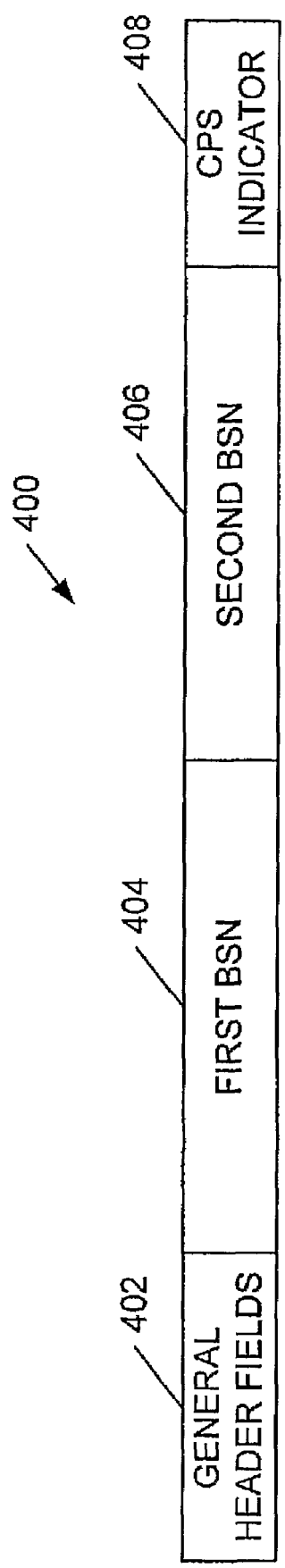
FIG. 4 illustrates an example of a radio block header, in accordance with an embodiment.

FIG. 4 illustrates an example of a radio block header 400, in accordance with an embodiment. In an embodiment, radio block header 400 includes a number of general header fields 402, which pertain to the radio block in general. In addition, in an embodiment, radio block header includes a first Block Sequence Number (BSN) field 404, a second BSN field 406, and a Coding and Puncturing Scheme (CPS) indicator field 408.

Some or all of the general header fields 402 may be consolidated at a beginning portion of the associated radio block (e.g., radio block 300, FIG. 3), or they may be located in one or more other portions of the associated radio block. Further, the fields within general header fields 402 may differ depending on whether the associated radio block (e.g., radio block 300, FIG. 3) is a downlink radio block or an uplink radio block.

A BSN field indicates the sequence number for a data block within the radio block. The sequence number may be assigned by the MAC layer and encoded. In EGPRS, for example, the sequence number may be encoded as a binary number (e.g., a number within a range of 0 to 2047). Accordingly, first BSN field 404 may indicate the sequence number assigned to the first data block (e.g., first data block 304, FIG. 3) of a radio block (e.g., radio block 300, FIG. 3), and second BSN field 406 may indicate the sequence number assigned to the second data block (e.g., second data block 306, FIG. 3) of the radio block.

CPS indicator field 408 is used to indicate the selected channel coding and puncturing schemes for the radio block. For example, in EGPRS, CPS indicator field 408 may indicate one of nine modulation and coding schemes (MCS-1 through MCS-9) and one or more of three puncturing schemes (P1, P2, and P3). For MCS-7 through MCS-9, CPS indicator field 408 indicates a selected modulation and coding scheme and two puncturing schemes (e.g., a first puncturing scheme to be applied for the first data block and a second puncturing scheme to be applied for the second data block).

The CPS indicator may be encoded. For example, according to EGPRS, the CPS indicator may be encoded using five bits according to the table, below:

TABLE 1

Encoded CPS Indicators

| bits 54321 | CPS |
| --- | --- |
| 00000 | (MCS-9/P1; MCS-9/P1) |
| 00001 | (MCS-9/P1; MCS-9/P2) |
| 00010 | (MCS-9/P1; MCS-9/P3) |
| 00100 | (MCS-9/P2; MCS-9/P1) |
| 00101 | (MCS-9/P2; MCS-9/P2) |
| 00110 | (MCS-9/P2; MCS-9/P3) |
| 01000 | (MCS-9/P3; MCS-9/P1) |
| 01001 | (MCS-9/P3; MCS-9/P2) |
| 01010 | (MCS-9/P3; MCS-9/P3) |
| 01011 | (MCS-8/P1; MCS-8/P1) |
| 01100 | (MCS-8/P1; MCS-8/P2) |
| 01101 | (MCS-8/P1; MCS-8/P3) |
| 01110 | (MCS-8/P2; MCS-8/P1) |
| 01111 | (MCS-8/P2; MCS-8/P2) |
| 10000 | (MCS-8/P2; MCS-8/P3) |
| 10001 | (MCS-8/P3; MCS-8/P1) |
| 10011 | (MCS-8/P3; MCS-8/P3) |
| 10100 | (MCS-7/P1; MCS-7/P1) |
| 10101 | (MCS-7/P1; MCS-7/P2) |
| 10110 | (MCS-7/P1; MCS-7/P3) |
| 10111 | (MCS-7/P2; MCS-7/P1) |
| 11000 | (MCS-7/P2; MCS-7/P2) |
| 11001 | (MCS-7/P2; MCS-7/P3) |
| 11010 | (MCS-7/P3; MCS-7/P1) |
| 11011 | (MCS-7/P3; MCS-7/P2) |
| 11100 | (MCS-7/P3; MCS-7/P3) |

For MCS-7 through MCS-9, the data blocks within a radio block typically are selected to be different blocks. Accordingly, the BSNs in fields 404 and 406 indicate different data blocks. In addition, as the above Table 1 indicates, the two selected puncturing schemes for the data blocks may be the same or different. For example, the first CPS, encoded as "00000," indicates that puncturing scheme "P1" is used to puncture both data blocks. Conversely, the second CPS, encoded as "000001," indicates that puncturing scheme "P1" is used to puncture one data block, and puncturing scheme "P2" is used to puncture the other data block.

The entire set of available CPS may be characterized, in an embodiment, to include a first subset of CPS having the same puncturing scheme for the data blocks, and a second, mutually-exclusive subset of CPS having different puncturing schemes for the data blocks. According to Table 1, the first subset includes CPS encoded as: 00000, 00101, 01010, 01011, 01111, 10011, 10100, 11000, and 11100. The second subset includes CPS encoded as: 00001, 00010, 00100, 00110, 01000, 01001, 01100, 01101, 01110, 10000, 10001, 10010, 01100, 01101, 01110, 10000, 10001, 10010, 10101, 10110, 10111, 11001, 11010, and 11011. It is to be understood that the encoded values represented in Table 1 are for example purposes only. In other embodiments, other encoded values may be used, more fewer or different CPS may be available, and/or the values may be arranged in a different order from that shown. Further, compression schemes other than a puncturing scheme may be used and represented, and the number of available compression schemes may be greater than or less than three, in other embodiments.

According to an embodiment, for at least some radio blocks, the two data blocks included within a radio block may be selected to be the same. Accordingly, the sequence numbers in BSN fields 404 and 406 may indicate the same data block (e.g., the sequence numbers may be the same). Further, in an embodiment, when the data blocks within a radio block are selected to be the same, the two selected puncturing schemes may be selected to be different. Accordingly, a CPS may be selected from the second subset of CPS, described in the previous paragraph, which includes CPS representing different puncturing schemes for the data blocks within a radio block, in accordance with an embodiment. When a same encoded data block is punctured using a first puncturing scheme and a second puncturing scheme, the second puncturing scheme produces a different result from the first puncturing scheme. Such embodiments will be described in more detail below.

Figure 5:
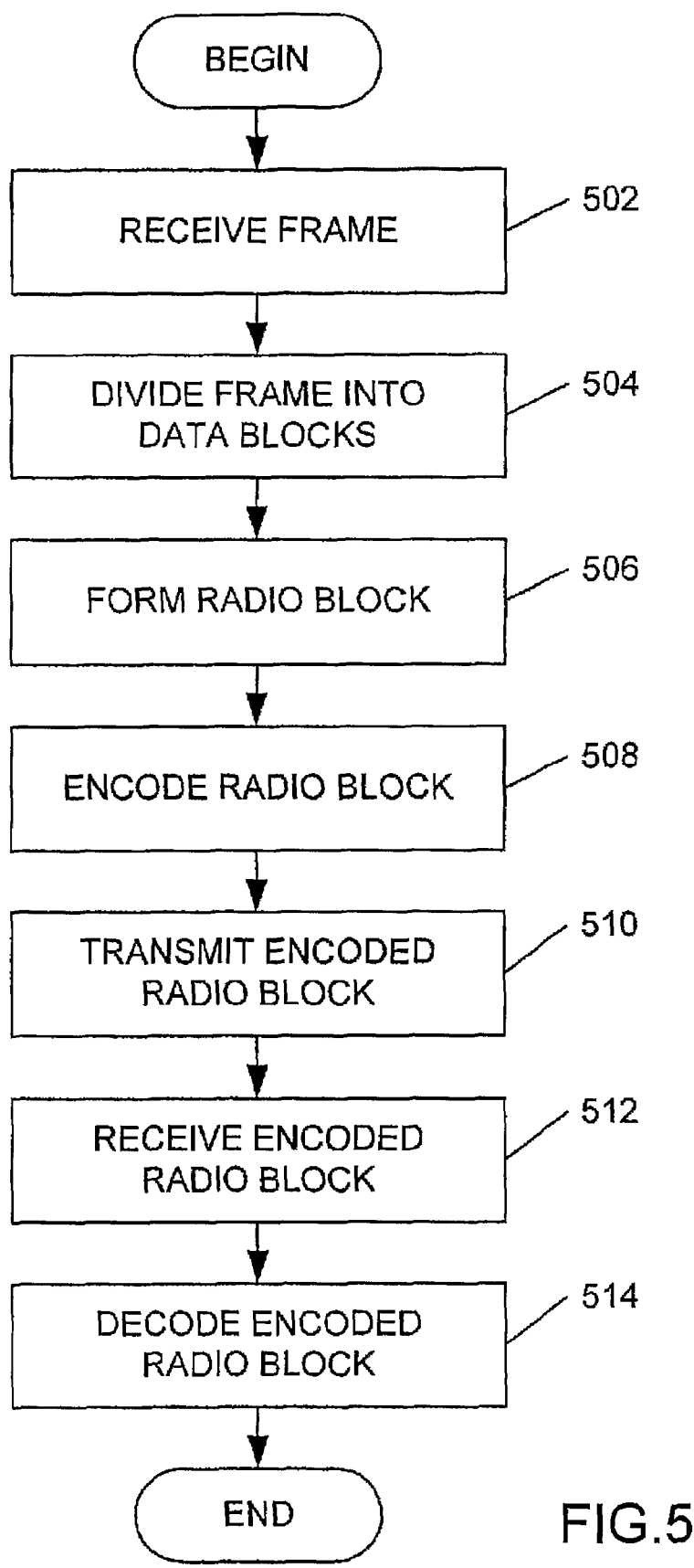
FIG. 5 is a flowchart of a procedure for forming, encoding, transmitting, receiving, and decoding a radio block, in accordance with an embodiment.
Figure 6:
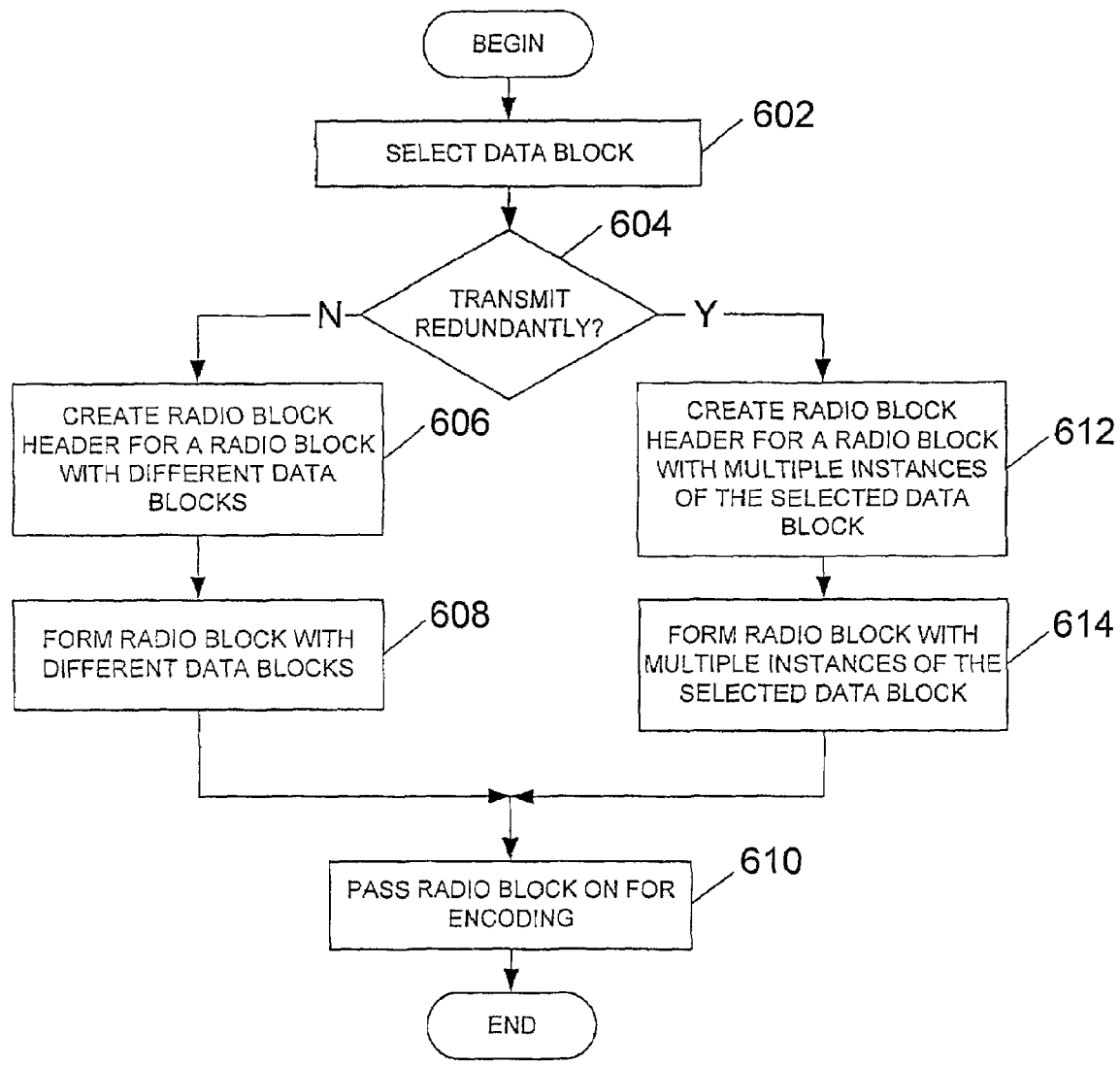
FIG. 6 is a flowchart of a procedure for forming a radio block, in accordance with an embodiment.
Figure 7:
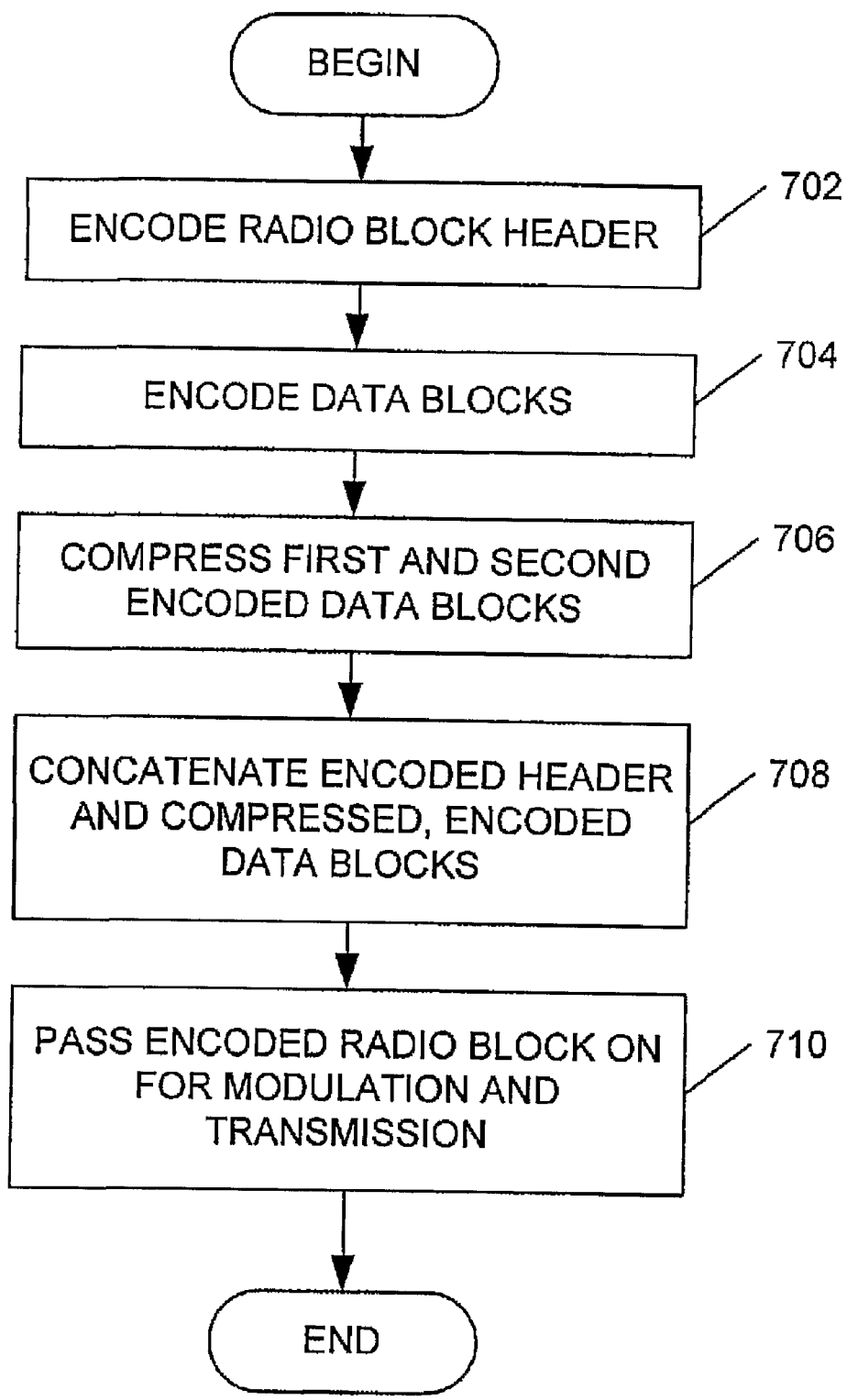
FIG. 7 is a flowchart of a procedure for encoding a radio block, in accordance with an embodiment.
Figure 8:
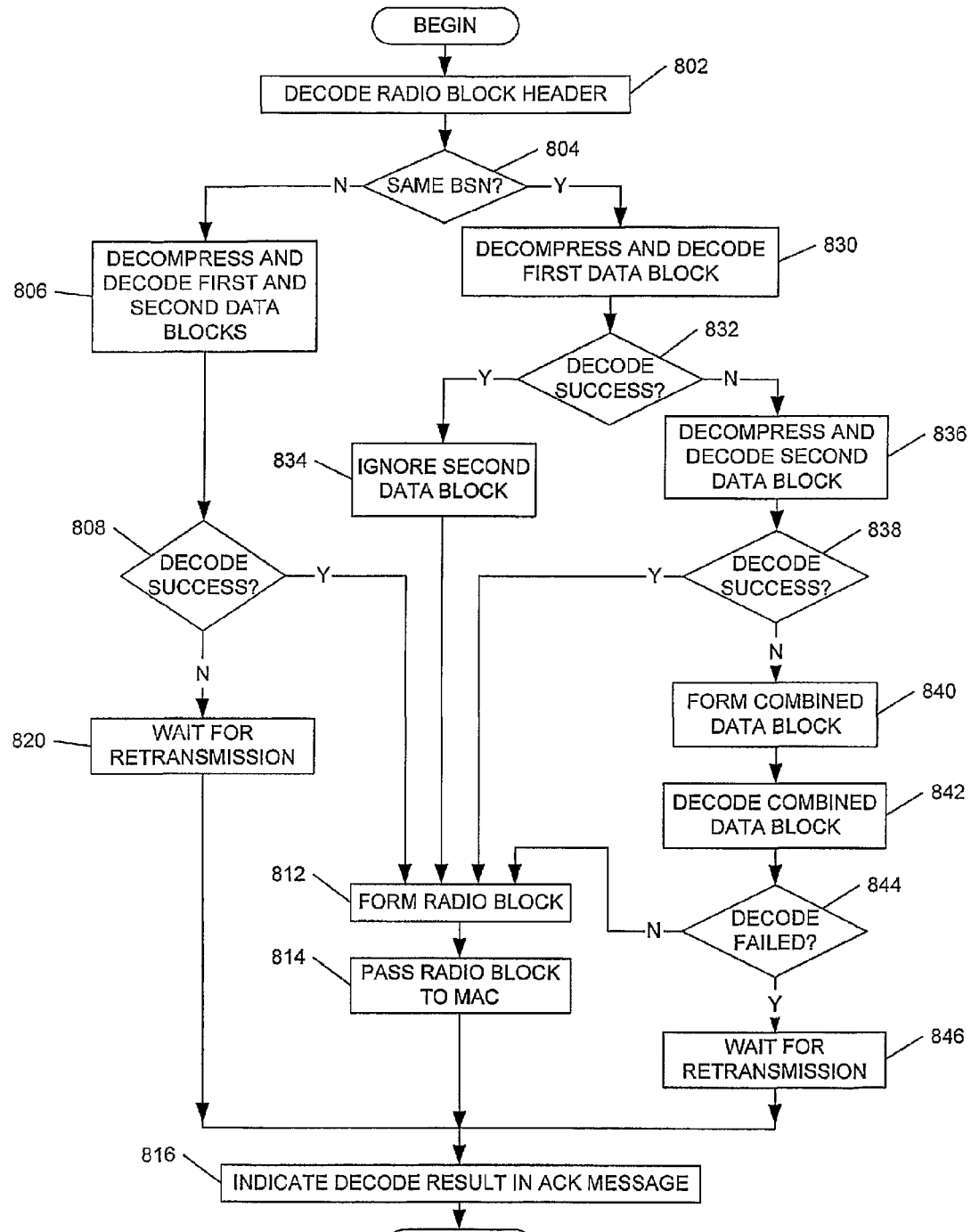
FIG. 8 illustrates a flowchart of a procedure for decoding an encoded radio block, in accordance with an embodiment.

FIGS. 5-8 illustrate flowcharts of procedures for implementing various embodiments. FIG. 5 illustrates a high-level view of a data communication procedure, and FIGS. 6-8 illustrate more detail of some of the process blocks of FIG. 5. The procedures illustrated and described may be performed in different orders from those that are disclosed. In addition, some or all portions of the procedures may be performed in parallel with other portions. Further, although the procedures are described as having an "end," they may be continuously and/or repeatedly performed.

FIG. 5 is a flowchart of a procedure for a transmitter to form, encode, and transmit a radio block, and for a receiver to receive and decode a radio block, in accordance with an embodiment. The procedure begins, in block 502, when a MAC layer receives a frame of data (e.g., from an LLC layer). In an embodiment, the MAC layer may be implemented in a MAC device (e.g., device 204, FIG. 2) of a transmit apparatus.

In block 504, the MAC layer may divide the frame into multiple data blocks. In an embodiment, the MAC layer assigns a unique BSN to each of the multiple data blocks.

In block 506, the MAC layer forms a radio block (e.g., radio block 300, FIG. 3). Basically, formation of a radio block includes creating a radio block header (e.g., header 400, FIG. 4), and associating one or more data blocks (e.g., data blocks 304, 306, FIG. 3) with the radio block header. Formation of a radio block in accordance with various embodiments will be described in more detail in conjunction with FIG. 6.

In block 508, the radio block is encoded with compression (e.g., puncturing), and modulated. In an embodiment, radio block encoding and modulation may be performed by a PHY layer. For MCS-7 through MCS-9 of EGPRS, the encoded radio block includes an encoded radio block header, a first compressed, encoded data block, and a second compressed, encoded data block. The PHY layer may be implemented within a PHY device (e.g., PHY device 206, FIG. 2) of a transmit apparatus. Encoding a radio block in accordance with various embodiments will be described in more detail in conjunction with FIG. 7.

In block 510, the encoded radio block may be transmitted over the physical channel (e.g., the air interface). A receive apparatus may receive the encoded radio block from the physical channel, in block 512.

In block 514, the encoded radio block is decoded. Radio block decoding may be performed by a PHY layer. The PHY layer may be implemented within a PHY device (e.g., PHY device 206, FIG. 2) of a receive apparatus.

As discussed previously, in an acknowledged mode of operation, when the decoding process is successful, the receive apparatus may send an acknowledgement (ACK) message to the transmit apparatus. When the decoding process is not successful, then the receive apparatus may not send the ACK message, and/or may send a NACK message. If the transmit apparatus does not receive an ACK message within a certain period of time or receives a NACK message, the transmit apparatus may retransmit the data.

In accordance with an embodiment, a system uses a modified version of an incremental redundancy process, which may reduce the frequency of decoding failures, and thus may reduce the frequency of retransmissions. Accordingly, a higher data transfer rate may be achieved, using embodiments of the inventive subject matter. Decoding a radio block in accordance with various embodiments will be described in more detail in conjunction with FIG. 8. After decoding a radio block, the procedure ends.

More detail will now be given with regard to forming a radio block (e.g., block 506, FIG. 5). Forming a radio block may occur when one or more data blocks are available. As discussed previously, a MAC layer may produce multiple data blocks by dividing up an LLC frame received from the LLC layer. The number of data blocks produced for a particular LLC frame is related to the length of the frame, which may vary. Accordingly, the number of data blocks that represent a particular LLC frame also may vary, from frame to frame. The number of data blocks corresponding to an LLC frame may be even (e.g., 8, 54, or 100 blocks) or odd (e.g., 9, 55, or 101 blocks).

As discussed previously, a radio block formatted according to MCS-7 through MCS-9 of EGPRS includes a radio block header and two data blocks. When the number of data blocks corresponding to an LLC frame is even, the last radio block for the frame may include the last two data blocks. However, when the number of data blocks is odd, only one data block may be available to populate the last radio block for the frame. In accordance with an embodiment, the area within the last radio block that is available for a second data block (even though none may exist), is used in a manner to provide possible system performance improvements, as will be described below.

Typically, a radio block formatted in a manner consistent with MCS-7 through MCS-9 includes two different data blocks, assuming that two are available. In an embodiment, a selected data block may be transmitted "redundantly." When a selected data block is transmitted "redundantly," as the term is used herein, then two or more instances of the selected data block are included within a radio block.

In an embodiment, a selected data block may be transmitted redundantly when the selected data block is within an odd-numbered set of data blocks corresponding to an LLC frame. For example, two instances of a last data block of the set may be included in a radio block. In another embodiment, a selected data block may be transmitted redundantly if the selected data block is being retransmitted (e.g., a prior transmission of the selected data block was not acknowledged). In other embodiments, any one or more data blocks within a set of data blocks corresponding to an LLC frame may be transmitted redundantly. In other words, two instances of any data block may be included within a radio block, and not just two instances of a last data block. For example, it may be desirable to increase the likelihood that one or more (including all) data blocks of an LLC frame are received and decoded reliably. Accordingly, various data blocks may be selected to be redundantly transmitted, in accordance with an embodiment.

FIG. 6 is a flowchart of a procedure for forming a radio block (e.g., block 506, FIG. 5), in accordance with an embodiment. The procedure begins, in block 602, by selecting a first data block for inclusion in a radio block being formed. This data block may be referred to herein as a "first selected data block." The term "first selected data block" is not meant to imply a relative position of the selected data block within a sequence of data blocks associated with an LLC frame. Instead, the "first selected data block" may be the first data block within a sequence, the last data block within a sequence, or any data block in between.

In block 604, a determination is made whether or not the first selected data block should be transmitted redundantly, in an embodiment. As described in a preceding paragraph, in an embodiment, this may include determining whether the first selected data block is the last and only remaining block, associated with an LLC frame, which remains to be transmitted. Alternatively or in addition, this may include determining whether an odd number of data blocks is associated with an LLC frame. Alternatively or in addition, this may include determining whether the first selected data block is desired to be transmitted redundantly, regardless of the number of data blocks remaining to be transmitted and/or the number of data blocks associated with an LLC frame.

When the first selected data block is not to be transmitted redundantly, then in block 606, a radio block header is created for a radio block with different data blocks. In an embodiment, the radio block header is created to conform to an EGPRS specification. This may include populating a first BSN field (e.g., BSN field 404, FIG. 4) with a first BSN (e.g., the BSN associated with the first selected data block), and populating a second BSN field (e.g., BSN field 406) with a second, different BSN. Further, in an embodiment, a CPS may be included in a CPS indicator field (e.g., CPS indicator field 408) to indicate that a same or different puncturing scheme may be used to compress the first selected data block and a second selected data block.

In block 608, the radio block is formed. In an embodiment, this includes populating a first data block field (e.g., field 304, FIG. 3) with the first selected data block, and populating a second data block field (e.g., field 306, FIG. 3) with the different, second selected data block. The radio block may then be passed on to be encoded, in an embodiment, in block 610.

Referring back to block 604, when the first selected data block is to be transmitted redundantly, then in block 612, a radio block header is created for a radio block with multiple instances of the first selected data block. In an embodiment, the radio block header is created to conform to an EGPRS specification. This may include populating a first BSN field (e.g., BSN field 404, FIG. 4) with a first BSN (e.g., the BSN associated with the first selected data block), and populating a second BSN field (e.g., BSN field 406) with the same BSN. Further, in an embodiment, a CPS may be included in a CPS indicator field (e.g., CPS indicator field 408) to indicate that different puncturing schemes may be used to compress the first selected data block and the second instance of the first selected data block. In other words, referring to Table 1, above, a CPS may be selected from a subset of available CPS having different puncturing schemes for the data blocks (referred to previously as the "second subset of CPS").

As mentioned previously, each data block within a radio block is encoded prior to puncturing. In addition, a compression scheme other than a puncturing scheme may be used to compress the encoded data block. Accordingly, block 612 may alternatively be described as creating a radio block header that identifies a selected data block, a first compression scheme to compress a first encoded instance of the selected data block, and a second compression scheme to compress a second encoded instance of the selected data block, where the second compression scheme is different from the first compression scheme.

In block 614, the radio block is formed. In an embodiment, this includes populating a first data block field (e.g., field 304, FIG. 3) with a first instance of the first selected data block, and populating a second data block field (e.g., field 306, FIG. 3) with a second instance of the first selected data block. The radio block may then be passed on to be encoded, in an embodiment, in block 610, and the procedure ends.

More detail will now be given with regard to encoding a radio block (e.g., block 508, FIG. 5). FIG. 7 is a flowchart of a procedure for encoding a radio block, in accordance with an embodiment. In an embodiment, the radio block header is encoded, in block 702, to produce an encoded radio block header. The radio block header may be encoded using an encoding method that is different from (e.g., more robust) encoding methods used to encode the data blocks, in an embodiment. For example, but not by way of limitation, radio block header encoding may include subjecting the radio block header to a convolutional encoding process.

In block 704, the first data block and the second data block are encoded. The first and second data blocks are encoded, in an embodiment, according to one or more encoding schemes specified in the radio block header. For example, but not by way of limitation, data block encoding may include subjecting a data block to a convolutional encoding process.

In an embodiment, the encoding processes are indicated in one or more header fields (e.g., CPS indicator field 408, FIG. 4). In an embodiment, the first data block and the second data block are encoded using a modulation and coding scheme selected from a group of schemes that includes MCS-7, MCS-8, and MCS-9 of an EGPRS specification. For example, referring to Table 1, above, the CPS indicator field may include a value of "00001," which corresponds to MCS-9 for both the first and second data blocks. Accordingly, the first and second data blocks are encoded using MCS-9.

In an embodiment, as discussed previously, the first data block and the second data block may correspond to a same selected data block. Accordingly, once encoded, a first encoded instance of the selected data block and a second encoded instance of the selected data block may be produced.

In block 706, the first encoded data block and the second encoded data block are compressed, in an embodiment. Various different types of compression may be used. In an embodiment, a puncturing scheme is performed to compress the first and second encoded data blocks.

In an embodiment, the compression schemes are indicated in one or more header fields (e.g., CPS indicator field 408, FIG. 4). In an embodiment, the first encoded data block and the second encoded data block are compressed using one or more puncturing schemes selected from a group of schemes that includes P1, P2, and P3 of an EGPRS specification. For example, referring to Table 1, above, the CPS indicator field may include a value of "00001," which corresponds to puncturing scheme P1 for the first encoded data block, and puncturing scheme P2 for the second encoded data block. Accordingly, the first and second encoded data blocks are compressed using the P1 and P2 puncturing schemes, respectively. Performance of the compression schemes (e.g., the puncturing schemes) results in a first compressed, encoded data block and a second compressed, encoded data block, respectively.

When the first data block and the second data block correspond to the same selected data block (e.g., as indicated in the radio block header's BSN fields 404, 406, FIG. 4), only one of the first or second data blocks may be encoded, in an embodiment, and that one encoded data block may be used to produce the first and second compressed, encoded data blocks. For example, the first data block may be encoded, resulting in a first encoded data block. The first encoded data block may then be compressed using the first compression scheme, to produce the first compressed, encoded data block. The first encoded data block may also be compressed using the second compression scheme, to produce the second compressed, encoded data block. Alternatively, as described previously, both the first and second data blocks may be encoded and compressed using separate processes.

In block 708, the encoded header, the first compressed, encoded data block, and the second compressed, encoded data block are concatenated to produce an encoded radio block. The encoded radio block may then be passed on, in block 710, for modulation and transmission over the physical channel. The procedure then ends.

Ultimately, a transmitted, encoded radio packet may be received by a receive apparatus, which may then proceed to demodulate and decode the radio packet. More detail will now be given with regard to decoding an encoded radio block (e.g., block 514, FIG. 5). FIG. 8 illustrates a flowchart of a procedure for decoding an encoded radio block, in accordance with an embodiment. The procedure begins, in an embodiment, upon receipt and demodulation of an encoded radio block.

In an embodiment, an encoded radio block header is decoded, in block 802. Decoding an encoded radio block header may include performing an inverse process to the encoding process used at the transmit apparatus. Assuming radio block header decoding is successful, fields within the radio block header may be available for evaluation by the receive apparatus.

From the radio block header, the receive apparatus may extract information indicating how the data blocks within the encoded radio block should be decompressed and decoded. In an embodiment, the radio block header is consistent with an EGPRS specification, and may include one or more data block identifiers (e.g., first BSN 404 and second BSN 406, FIG. 4).

In block 804, a determination may be made whether the radio block includes redundantly transmitted, encoded data blocks ("redundant blocks"). In an embodiment, this may be determined by evaluating the BSNs, within the radio block header, for the first and second encoded data blocks. When the BSNs are the same, this may indicate that the radio block includes redundantly transmitted blocks. In other embodiments, another header field (or flag) may indicate that the radio block includes redundantly transmitted blocks, or information regarding redundancy may be transmitted to the receiver in another way (e.g., via separate message).

When a data block is not redundantly transmitted in a radio block (e.g., the first and second BSNs identify different data blocks), "standard" decompression and decoding processes may be performed. In an embodiment, blocks 806, 808, 812, 814, 816, and 820 may represent portions of standard decompression and decoding processes.

In an embodiment, in block 806, the first encoded data block and the second encoded data block are decompressed and decoded according to the decompression and decoding schemes specified in the radio block header. For example, in an embodiment, the receive apparatus may evaluate a CPS indicator field (e.g., CPS indicator field 408, FIG. 4) to determine which one or more decompression schemes and decoding schemes should be used to decompress and decode the encoded data blocks within the encoded radio block. In an embodiment, the first encoded data block and the second encoded data block are decompressed using an inverse puncturing scheme corresponding to a puncturing scheme selected from a group of schemes that includes P1, P2, and P3 of an EGPRS specification. Further, in an embodiment, the first encoded data block and the second encoded data block are decoded using a decoding scheme selected from a group of schemes that includes MCS-7, MCS-8, and MCS-9 of an EGPRS specification.

Decompression may be performed, for example, by inserting "unknown" values in the bit locations of an encoded data block, which had been omitted by the transmit apparatus. The resulting decompressed, encoded data blocks may then be stored for future use.

The decoder may successfully resolve the unknown bits within a decompressed, encoded data block by estimating the probabilities that the bits have certain values. The decompressed, encoded data block may be decoded, for example, using a multiple-stage decoding process. In an embodiment, one stage of the decoding process may include a convolutional decoding process (e.g., a Viterbi decoder). In an embodiment, another stage of the decoding process may include a decoding check process such as a Cyclic Redundancy Check (CRC). Based on the results of the decoding check process, decoding may be declared as correct or incorrect. In an embodiment, a decoding success flag may be set or cleared based on whether decoding was determined to be correct or incorrect.

A determination may be made, in block 808, whether the first encoded data block and the second encoded data block were successfully decoded. In an embodiment, one or more decoding results may be returned from the decoder, which indicate whether the decoding processes were successful. In an embodiment, a first decoding result is returned regarding the first data block, and a second decoding result is returned regarding the second data block. The determinations of whether the decoding processes were successful may be based on these results.

When the first and second encoded data blocks were successfully decoded, then in block 812, a decoded radio block may be formed. In an embodiment, this may be achieved by populating a radio block header (e.g., field 302, FIG. 3) with the decoded radio block header information, populating a first data block field (e.g., field 304, FIG. 3) with the decoded version of the first data block (the "first, decoded data block"), and populating a second data block field (e.g., field 306, FIG. 3) with the decoded version of the second data block (the "second, decoded data block"). The decoded radio block may be passed to the MAC layer, in block 814, for further processing. In an embodiment, the receive apparatus may then send an acknowledgement (ACK) message to the transmit apparatus, in block 816, indicating that the radio block was successfully received and decoded.

When the second encoded data block was not successfully decoded, as determined in block 808, then the receive apparatus may wait for retransmission of the radio block, in block 820. In an embodiment, the transmit apparatus may automatically retransmit the radio block when the transmitter fails to receive an ACK message for the radio block from the receive apparatus, or when the transmitter receives a NACK message. If a retransmitted radio block is received, the receive apparatus may use an incremental redundancy or other method to decode the first and/or second data blocks, in an embodiment.

In an embodiment, the receive apparatus may then indicate, within an ACK message, in block 816, that the radio block was successfully received and decoded. In some instances, an ACK message may be formed and sent to the transmit apparatus after successful decoding of each packet. In other instances, a multiple-block ACK message may be sent to the transmit apparatus after decoding of N packets, where N may equal a window size that may be set during the process of establishing a connection between the transmitter and the receiver. For example, in an embodiment, a multiple-block ACK message may include multiple flags, where a flag may be set or cleared to indicate the correct or incorrect decoding for each of N packets covered by the ACK message. The method may then end.

Referring again to block 804, when a data block is redundantly transmitted in a radio block (e.g., the first and second BSNs identify the same data block), "modified" (e.g., different from "standard") decompression and decoding processes may be performed, in accordance with various embodiments. In accordance with various embodiments, blocks 830, 832, 834, 836, 838, 840, 842, 844, 846, 812, 814, and 816 may represent portions of modified decompression and decoding processes, in accordance with various embodiments.

In block 830, the first encoded data block may be decompressed and decoded in a maimer similar to that described in conjunction with block 806. A version of the first decompressed, encoded data block may be stored for future use (e.g., in block 840, described later).

A determination may be made, in block 832, whether the first encoded data block was successfully decoded. In an embodiment, a decoding result regarding the first encoded data block may be returned from the decoder, and the determination of whether the decoding process is successful may be based on this result.

If the first data block was successfully decoded, then the second encoded data block may be ignored (e.g., not decompressed and/or decoded), in block 834, as it contains a redundant, encoded version of the first data block. In alternate embodiments, the second encoded data block may be decompressed and/or decoded regardless of whether or not the first data block was successfully decoded.

In block 812, a decoded radio block may be formed. In an embodiment, this may be achieved by populating a radio block header (e.g., field 302, FIG. 3) with the decoded radio block header information, and populating a first data block field (e.g., field 304, FIG. 3) with the decoded version of the first data block (the "first, decoded data block"). In an embodiment, the second data block field (e.g., field 306, FIG. 3) may be populated with a second instance of the first, decoded data block. Alternately, the second data block field may be populated with other values. The decoded radio block may be passed to the MAC layer, in block 814, for further processing. In an embodiment, the receive apparatus may then send an ACK message to the transmit apparatus, in block 816, indicating that the radio block was successfully received and decoded.

Referring back to block 832, when the first encoded data block was not successfully decoded, the second encoded data block may be decompressed and decoded, in block 836, in a manner similar to that described in conjunction with block 806. A version of the second decompressed, encoded data block may be stored for future use (e.g., in block 840, described later).

A determination may be made, in block 838, whether the second encoded data block was successfully decoded. In an embodiment, a decoding result regarding the second encoded data block may be returned from the decoder, and the determination of whether the decoding process is successful may be based on this result.

When the second encoded data block was successfully decoded, then in block 812, a decoded radio block may be formed. In an embodiment, this may be achieved by populating a radio block header (e.g., field 302, FIG. 3) with the decoded radio block header information, and populating a first data block field (e.g., field 304, FIG. 3) with the decoded version of the second data block (the "second, decoded data block"). In an embodiment, the second data block field (e.g., field 306, FIG. 3) may be populated with a second instance of the second, decoded data block. Alternately, the second data block field may be populated with other values. The decoded radio block may be passed to the MAC layer, in block 814, for further processing. In an embodiment, in block 816, the receive apparatus may then indicate, in a single or multiple-block ACK message, that the radio block was successfully received and decoded, and the method may end.

Referring again to block 838, when the second encoded data block was not successfully decoded, then a "combined" data block may be formed, in block 840. In an embodiment, a combined data block may be formed by combining the first decompressed, encoded data block (e.g., from block 830) and the second decompressed, encoded data block (e.g., from block 836). A basis for combining the decompressed, encoded data blocks is explained below.

In an embodiment, as described previously, when a selected data block is being redundantly transmitted, the transmit apparatus may select different compression schemes to compress the multiple iterations of the encoded version of the selected data block. For example, the transmit apparatus may select a CPS from a subset of available CPS that includes different puncturing schemes for the first and second data blocks (see Table 1 and the associated description, above). Accordingly, when the first and second compressed, encoded data blocks are decompressed by the receive apparatus, the decompression process may cause the resulting decompressed, encoded data blocks to have "unknown" bits at different bit locations from each other.

"Combining" the first and second decompressed, encoded data blocks may include replacing some or all "unknown" bits within the first decompressed, encoded data block with "known" bits in corresponding locations within the second decompressed, encoded data block, or vice versa. Alternatively, "combining" may include replacing some or all "unknown" bits within the first or second decompressed, encoded data block with another substitute value (e.g., a "0" or a "1") or a mathematically calculated bit value (e.g., a mean, median or average of the values within the corresponding bit locations). In another embodiment, some or all "known" bits may be replaced, as well.

In block 842, the combined data block may be decoded in a manner similar to that described in conjunction with block 806. A determination may be made, in block 844, whether the combined data block was successfully decoded. In an embodiment, a decoding result regarding the combined data block may be returned from the decoder, and the determination of whether the decoding process is successful may be based on this result.

When the combined data block was successfully decoded, then in block 812, a decoded radio block may be formed. In an embodiment, this may be achieved by populating a radio block header (e.g., field 302, FIG. 3) with the decoded radio block header information, and populating a first data block field (e.g., field 304, FIG. 3) with the decoded version of the combined data block (the "combined, decoded data block"). In an embodiment, the second data block field (e.g., field 306, FIG. 3) may be populated with a second instance of the combined, decoded data block. Alternately, the second data block field may be populated with other values. The decoded radio block may be passed to the MAC layer, in block 814, for further processing. In an embodiment, the receive apparatus may then indicate, within a single or multiple-block ACK message, in block 816, that the radio block was successfully received and decoded.

Referring again to block 844, when the combined data block was not successfully decoded, then the receive apparatus may wait for retransmission of the radio block, in block 846. In an embodiment, the transmit apparatus may automatically retransmit the radio block when the transmitter fails to receive an ACK message for the radio block from the receive apparatus or when the transmitter received a NACK message. If a retransmitted radio block is received, the receive apparatus may use an incremental redundancy or another method to decode the first and/or second data blocks, in an embodiment. In an embodiment, the receive apparatus may then indicate, within an ACK message, in block 816, that the radio block was successfully received and decoded. The method may then end.

It is to be understood that variations in the flowcharts depicted in FIGS. 5-8 may be made while achieving the same or similar results as described herein. Accordingly, such variations are intended to be included within the scope of the inventive subject matter. In particular, the ordering of the various blocks may be changed, the process therein may be combined together or performed separately, and/or blocks may be deleted and/or added to achieve the same or similar results.

Various embodiments of a data transmission method, apparatus, and system have been described above. The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

It is to be understood that various embodiments may be implemented in conjunction with data transfer specifications or standards other than EGPRS and 802.11, modulation and coding schemes other than MCS-7, MCS-8, and MCS-9 of EGPRS, compression schemes other than P1, P2, and P3 of EGPRS, and/or types of networks and devices other than wireless devices and systems illustrated and described in conjunction with FIGS. 1 and 2. Accordingly, embodiments described above are not meant to limit the scope of the inventive subject matter only to those embodiments. Instead, embodiments may be applied in conjunction with different data transfer specifications, modulation and coding schemes, compression schemes, devices, and networks.

The various methods and procedures described herein can be implemented in hardware, firmware or software. A software implementation can include program instructions in the form of microcode, assembly language code, or a higher-level language code. The program instructions may be stored on one or more volatile or non-volatile computer-readable media during execution (e.g., by a transmit apparatus or receive apparatus) or at other times. These computer-readable media may include hard disks, removable magnetic disks, removable optical disks, magnetic cassettes, flash memory cards, digital video disks, Bernoulli cartridges, random access memories (RAMs), read only memories (ROMs), and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Embodiments of the inventive subject matter may be referred to, individually and/or collectively herein, by the term "invention." This term is used merely for convenience and without intending voluntarily to limit the scope of this application to any single invention or inventive concept, if more than one is in fact disclosed.

What is claimed is:

1. A method comprising:
   receiving a frame of data;
   dividing the frame into an odd number of multiple data blocks;
   creating a radio block header that identifies a selected data block included in the multiple data blocks, a first compression scheme to compress a first encoded instance of the selected data block, and a second compression scheme to compress a second encoded instance of the selected data block, wherein the second compression scheme is different from the first compression scheme; and
   forming a radio block that includes the radio block header, the first instance of the selected data block, and the second instance of the selected data block.

2. The method as claimed in claim 1 wherein the selected data block is a last block of the multiple data blocks.

3. The method as claimed in claim 1, further comprising:
   encoding the radio block header to produce an encoded radio block header;
   encoding the selected data block to produce the first encoded instance and the second encoded instance;
   compressing the first encoded instance using the first compression scheme to produce a first compressed, encoded data block;
   compressing the second encoded instance using the second compression scheme to produce a second compressed, encoded data block;
   forming an encoded radio block from the encoded radio block header, the first compressed, encoded data block, and the second compressed, encoded data block; and
   transmitting the encoded radio block over a physical channel.

4. The method as claimed in claim 3, wherein encoding the selected data block comprises:
   encoding the selected data block using a modulation and coding scheme selected from a group of schemes that includes Modulation and Coding Schemes (MCS)-7, MCS-8, and MCS-9 of an Enhanced General Packet Radio Service specification.

5. The method as claimed in claim 1, wherein the first compression scheme includes a first puncturing scheme and the second compression scheme includes a second puncturing scheme.

6. The method as claimed in claim 1, wherein creating the radio block header comprises:
   creating the radio block header to conform to an Enhanced General Packet Radio Service specification, wherein the radio block header includes a first block sequence number field to identify the selected data block, a second block sequence number field to identify the selected data block, and a field to identify the first compression scheme and the second compression scheme.

7. A method comprising:
   receiving an encoded radio block from a physical channel, wherein the encoded radio block includes an encoded radio block header, a first compressed, encoded data block, and a second compressed, encoded data block;
   decoding the encoded radio block header to determine a first data block identifier corresponding to the first compressed, encoded data block, and a second data block identifier corresponding to the second compressed, encoded data block;
   comparing the first data block identifier and the second data block identifier; and
   responsive to determining that the first data block identifier and the second data block identifier identify a same data block:
      decompressing the first compressed, encoded data block using a first decompression scheme that is an inverse of a first compression scheme identified in the encoded radio block header, to produce a first encoded data block;
      decoding the first encoded data block, to produce a first decoded data block and a first decoding result;
      determining whether the first decoding result indicates a decoding failure, and responsive to determining that the first decoding result indicates a decoding failure, combining the first encoded data block and a second encoded data block to produce a combined data block, wherein the second encoded data block includes a decompressed version of the second compressed, encoded data block; and
      decoding the combined data block to produce a combined decoded data block.

8. The method as claimed in claim 7, wherein the first compression scheme comprises a first puncturing scheme.

9. The method as claimed in claim 7, wherein the decoding comprises:
   decoding the first encoded data block using a demodulation and decoding scheme selected from a group of schemes that includes MCS-7, MCS-8, and MCS-9 of an Enhanced General Packet Radio Service specification.

10. A method comprising:
receiving an encoded radio block from a physical channel, wherein the encoded radio block includes an encoded radio block header, a first compressed, encoded data block, and a second compressed, encoded data block;
decoding the encoded radio block header to determine a first data block identifier corresponding to the first compressed, encoded data block, and a second data block identifier corresponding to the second compressed, encoded data block;
comparing the first data block identifier and the second data block identifier; and
responsive to determining that the first data block identifier and the second data block identifier identify a same data block:
decompressing the first compressed, encoded data block using a first decompression scheme that is an inverse of a first compression scheme identified in the encoded radio block header, to produce a first encoded data block;
decoding the first encoded data block, to produce a first decoded data block and a first decoding result;
determining whether the first decoding result indicates a decoding failure, and responsive to determining that the first decoding result indicates a decoding failure, decompressing the second compressed, encoded data block using a second decompression scheme that is an inverse of a second compression scheme identified in the encoded radio block header, to produce a second encoded data block; and
decoding the second encoded data block to produce a second decoded data block and a second decoding result.

11. The method as claimed in claim 10, comprising:
sending an acknowledgement message over the physical channel.

12. The method as claimed in claim 10, comprising:
determining whether the second decoding result indicates a decoding failure, and responsive to determining that the second decoding result indicates a decoding failure,
combining the first encoded data block and the second encoded data block to produce a combined data block and
decoding the combined data block to produce a combined decoded data block and a third decoding result.

13. The method as claimed in claim 12, comprising:
sending an acknowledgement message over the physical channel.

14. A method comprising:
creating, in a transmit apparatus' medium access control device, a radio block header that identifies a selected data block, a first compression scheme to compress a first encoded instance of the selected data block, and a second compression scheme to compress a second encoded instance of the selected data block, wherein the second compression scheme is different from the first compression scheme;
forming, in the transmit apparatus' medium access control device, a radio block that includes the radio block header, a first instance of the selected data block, and a second instance of the selected data block;
encoding and compressing, in a transmit apparatus' physical device, the radio block to produce an encoded radio block, wherein the encoded radio block includes an encoded radio block header, a first compressed, encoded data block, and a second compressed, encoded data block;
transmitting, from the transmit apparatus' physical device, the encoded radio block over a physical channel;
receiving, in a receive apparatus' physical device, the encoded radio block from the physical channel;
decoding, in the receive apparatus' physical device, the encoded radio block header to determine a first data block identifier corresponding to the first compressed, encoded data block, and a second data block identifier corresponding to the second compressed, encoded data block;
performing standard decompression and decoding processes, in the receive apparatus' physical device, when the first data block identifier and the second data block identifier identify different data blocks; and
performing modified decompression and decoding processes, in the receive apparatus' physical device, when the first data block identifier and the second data block identifier identify a same data block.

15. The method as claimed in claim 14, wherein encoding and compressing the radio block comprises:
encoding the radio block header to produce an encoded radio block header;
encoding the selected data block to produce the first encoded instance and the second encoded instance;
compressing the first encoded instance using the first compression scheme to produce a first compressed, encoded data block;
compressing the second encoded instance using the second compression scheme to produce a second compressed, encoded data block; and
forming an encoded radio block from the encoded radio block header, the first compressed, encoded data block, and the second compressed, encoded data block.

16. The method as claimed in claim 15, wherein performing the modified decompression and decoding process comprises:
decompressing the first compressed, encoded data block using a first decompression scheme that is an inverse of a first compression scheme identified in the encoded radio block header, to produce a first encoded data block;
decoding the first encoded data block, to produce a first decoded data block and a first decoding result;
when the first decoding result indicates a decoding failure, combining the first encoded data block and a second encoded data block to produce a combined data block, wherein the second encoded data block includes a decompressed and decoded version of the second compressed, encoded data block; and
decoding the combined data block to produce a combined decoded data block.

17. A system comprising:
a medium access control device to receive a frame of data, divide the frame into an odd number of multiple data blocks, create a radio block header that identifies a selected data block included in the multiple data blocks, a first compression scheme to compress a first encoded instance of the selected data block, and a second compression scheme to compress a second encoded instance of the selected data block, wherein the second compression scheme is different from the first compression scheme, and wherein the medium access control device is also to form a radio block that includes the radio block header, a first instance of the selected data block, and a second instance of the selected data block;
a physical device, coupled to the medium access control device, to encode and to compress the radio block to produce an encoded radio block, wherein the encoded radio block includes an encoded radio block header, a first compressed, encoded data block, and a second compressed, encoded data block; and an antenna to transmit the encoded radio block over a physical channel.

18. The system as claimed in claim 17, wherein the physical device is to encode and to compress by:

encoding the radio block header to produce an encoded radio block header;

encoding the selected data block to produce the first encoded instance and the second encoded instance;

compressing the first encoded instance using the first compression scheme to produce a first compressed, encoded data block;

compressing the second encoded instance using the second compression scheme to produce a second compressed, encoded data block; and forming an encoded radio block from the encoded radio block header, the first compressed, encoded data block, and the second compressed, encoded data block.

19. A system comprising:

an antenna to receive an encoded radio block from a physical channel, wherein the encoded radio block includes an encoded radio block header, a first compressed, encoded data block, and a second compressed, encoded data block;

a physical device to decode the encoded radio block header to determine a first data block identifier corresponding to the first compressed, encoded data block, and a second data block identifier corresponding to the second compressed, encoded data block, and wherein the physical device is also to compare the first data block identifier and the second data block identifier, and responsive to determining that the first data block identifier and the second data block identifier identify a same data block the physical device is to:

decompress the first compressed, encoded data block using a first decompression scheme that is an inverse of a first compression scheme identified in the encoded radio block header, to produce a first encoded data block;

decode the first encoded data block, to produce a first decoded data block and a first decoding result;

determine whether the first decoding result indicates a decoding failure;

responsive to determining that the decoding result indicates a decoding failure, combining the first encoded data block and a second encoded data block to produce a combined data block, wherein the second encoded data block includes a decompressed version of the second compressed, encoded data block; and decoding the combined data block to produce a combined decoded data block.

20. A system comprising:

an antenna to receive an encoded radio block from a physical channel, wherein the encoded radio block includes an encoded radio block header, a first compressed, encoded data block, and a second compressed, encoded data block;

a physical device to decode the encoded radio block header to determine a first data block identifier corresponding to the first compressed, encoded data block, and a second data block identifier corresponding to the second compressed, encoded data block, and wherein the physical device is also to compare the first data block identifier and the second data block identifier, and responsive to determining that the first data block identifier and the second data block identifier identify a same data block the physical device is to:

decompress the first compressed, encoded data block using a first decompression scheme that is an inverse of a first compression scheme identified in the encoded radio block header, to produce a first encoded data block;

decode the first encoded data block, to produce a first decoded data block and a first decoding result;

determine whether the first decoding result indicates a decoding failure and responsive to determining that the first decoding result indicates a decoding failure, decompress the second compressed, encoded data block using a second decompression scheme that is an inverse of a second compression scheme identified in the encoded radio block header, to produce a second encoded data block; and decode the second encoded data block to produce a second decoded data block and a second decoding result.

21. A non-transitory machine readable medium that stores instructions which when performed by a machine, causes the machine to perform operations comprising:

receiving a frame of data;

dividing the frame into an odd number of multiple data blocks;

creating a radio block header that identifies a selected data block included in the multiple data blocks, a first compression scheme to compress a first encoded instance of the selected data block, and a second compression scheme to compress a second encoded instance of the selected data block, wherein the second compression scheme is different from the first compression scheme; and forming a radio block that includes the radio block header, the first instance of the selected data block, and the second instance of the selected data block.

22. The non-transitory machine-readable medium of claim 21, wherein the instructions comprise:

encoding the radio block header to produce an encoded radio block header;

encoding the selected data block to produce the first encoded instance and the second encoded instance;

compressing the first encoded instance using the first compression scheme to produce a first compressed, encoded data block;

compressing the second encoded instance using the second compression scheme to produce a second compressed, encoded data block;

forming an encoded radio block from the encoded radio block header, the first compressed, encoded data block, and the second compressed, encoded data block; and transmitting the encoded radio block over a physical channel.

23. The non-transitory machine-readable medium of claim 21, wherein the instructions comprise:

encoding the selected data block using a modulation and coding scheme selected from a group of schemes that includes MCS-7, MCS-8, and MCS-9 of an Enhanced General Packet Radio Service specification.

24. A non-transitory machine readable medium that stores instructions which when performed by a machine, causes the machine to perform operations comprising:

receiving an encoded radio block from a physical channel, wherein the encoded radio block includes an encoded radio block header, a first compressed, encoded data block, and a second compressed, encoded data block;

decoding the encoded radio block header to determine a first data block identifier corresponding to the first compressed, encoded data block, and a second data block identifier corresponding to the second compressed, encoded data block;

comparing the first data block identifier and the second data block identifier; and responsive to determining that the first data block identifier and the second data block identifier identify a same data block:

decompressing the first compressed, encoded data block using a first decompression scheme that is an inverse of a first compression scheme identified in the encoded radio block header, to produce a first encoded data block;

decoding the first encoded data block, to produce a first decoded data block and a first decoding result;

determining whether the first decoding result indicates a decoding failure, and responsive to determining that the first decoding result indicates a decoding failure, combining the first encoded data block and a second encoded data block to produce a combined data block, wherein the second encoded data block includes a decompressed version of the second compressed, encoded data block; and decoding the combined data block to produce a combined decoded data block.

25. A non-transitory machine readable medium that stores instructions which when performed by a machine, causes the machine to perform operations comprising:

receiving an encoded radio block from a physical channel, wherein the encoded radio block includes an encoded radio block header, a first compressed, encoded data block, and a second compressed, encoded data block;

decoding the encoded radio block header to determine a first data block identifier corresponding to the first compressed, encoded data block, and a second data block identifier corresponding to the second compressed, encoded data block;

comparing the first data block identifier and the second data block identifier; and responsive to determining that the first data block identifier and the second data block identifier identify a same data block:

decompressing the first compressed, encoded data block using a first decompression scheme that is an inverse of a first compression scheme identified in the encoded radio block header, to produce a first encoded data block;

decoding the first encoded data block, to produce a first decoded data block and a first decoding result;

determining whether the first decoding result indicates a decoding failure, and responsive to determining that the first decoding result indicates a decoding failure, decompressing the second compressed, encoded data block using a second decompression scheme that is an inverse of a second compression scheme identified in the encoded radio block header, to produce a second encoded data block; and decoding the second encoded data block to produce a second decoded data block and a second decoding result.

* * * * *